(12) United States Patent
Izumi

(10) Patent No.: US 7,738,209 B2
(45) Date of Patent: Jun. 15, 2010

(54) RECORDING MEDIUM DRIVING DEVICE

(75) Inventor: Mitsuhiro Izumi, Yokohama (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/484,057

(22) Filed: Jun. 12, 2009

(65) Prior Publication Data

US 2010/0027156 A1 Feb. 4, 2010

(30) Foreign Application Priority Data

Aug. 1, 2008 (JP) .............................. 2008-200069

(51) Int. Cl.
*G11B 15/18* (2006.01)
(52) U.S. Cl. ...................................................... 360/69
(58) Field of Classification Search .................. 360/69, 360/75, 55, 78.04, 97.01, 97.02, 264.2; 710/74; 720/649

See application file for complete search history.

(56) References Cited

U.S. PATENT DOCUMENTS

| 5,732,215 | A | * | 3/1998 | Boutaghou et al. ............ 710/74 |
| 5,956,203 | A | | 9/1999 | Schirle et al. |
| 6,731,453 | B2 | * | 5/2004 | Korbel et al. ............. 360/78.04 |
| 7,050,254 | B1 | * | 5/2006 | Yu et al. ........................ 360/55 |
| 7,203,021 | B1 | * | 4/2007 | Ryan et al. ..................... 360/75 |
| 7,450,334 | B1 | * | 11/2008 | Wang et al. .................... 360/75 |
| 7,518,818 | B2 | * | 4/2009 | Yamazaki et al. .............. 360/75 |
| 7,609,473 | B1 | * | 10/2009 | Mate ........................... 360/75 |
| 2002/0030924 | A1 | | 3/2002 | Shimizu et al. |
| 2002/0075592 | A1 | | 6/2002 | Tokuyama et al. |
| 2002/0093760 | A1 | * | 7/2002 | Okunaga et al. ......... 360/97.01 |
| 2003/0235012 | A1 | * | 12/2003 | Nishizawa ............... 360/264.2 |
| 2004/0103625 | A1 | * | 6/2004 | Nakano et al. ............. 55/385.2 |
| 2005/0210484 | A1 | * | 9/2005 | Cheng ........................ 720/649 |
| 2006/0119974 | A1 | * | 6/2006 | Yamazaki et al. .............. 360/75 |
| 2007/0097544 | A1 | * | 5/2007 | Lim et al. ................. 360/97.02 |
| 2007/0153412 | A1 | * | 7/2007 | Takeda et al. .................. 360/69 |

FOREIGN PATENT DOCUMENTS

| JP | A 11-110960 | 4/1999 |
| JP | A 2000-156068 | 6/2000 |

* cited by examiner

*Primary Examiner*—Fred Tzeng
(74) *Attorney, Agent, or Firm*—Greer, Burns & Crain, Ltd.

(57) ABSTRACT

A magnetic disk device includes a VCM coil that controls the movement of a head for recording or reproducing information onto and from a rotating magnetic disk, and an airflow guiding unit that guides an airflow occurring by the rotation of the magnetic disk toward the VCM coil when the temperature of the VCM coil exceeds a limit temperature defined in advance.

5 Claims, 4 Drawing Sheets

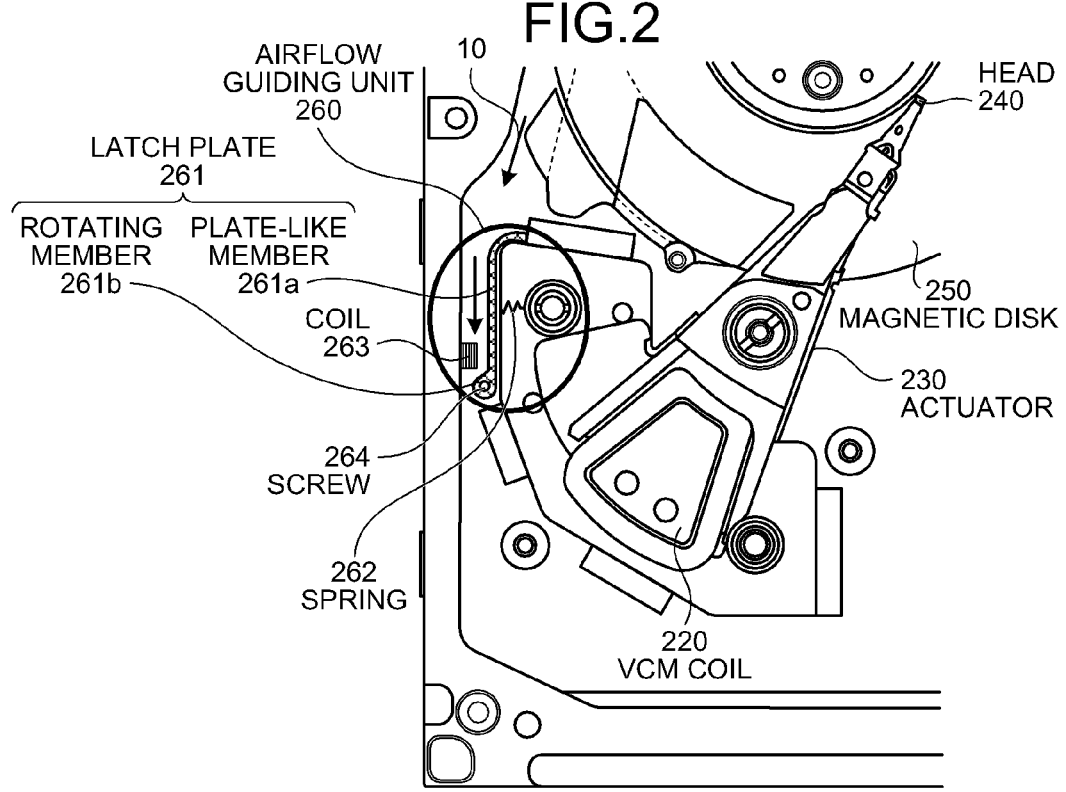
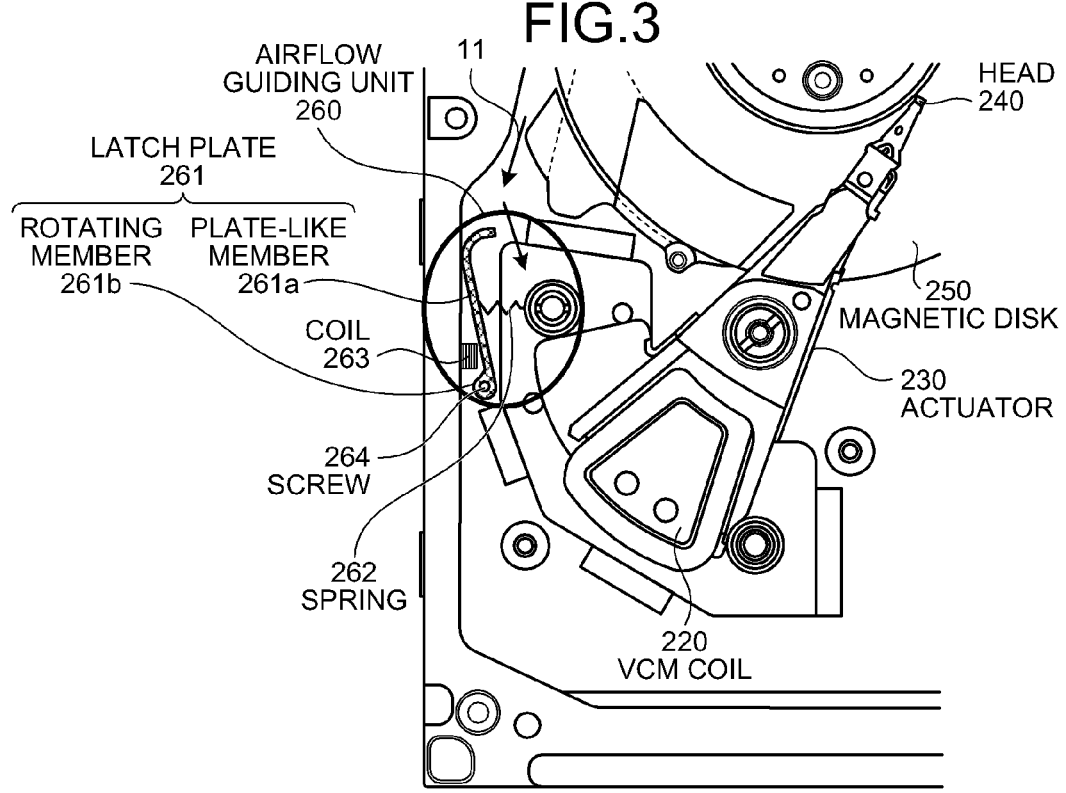

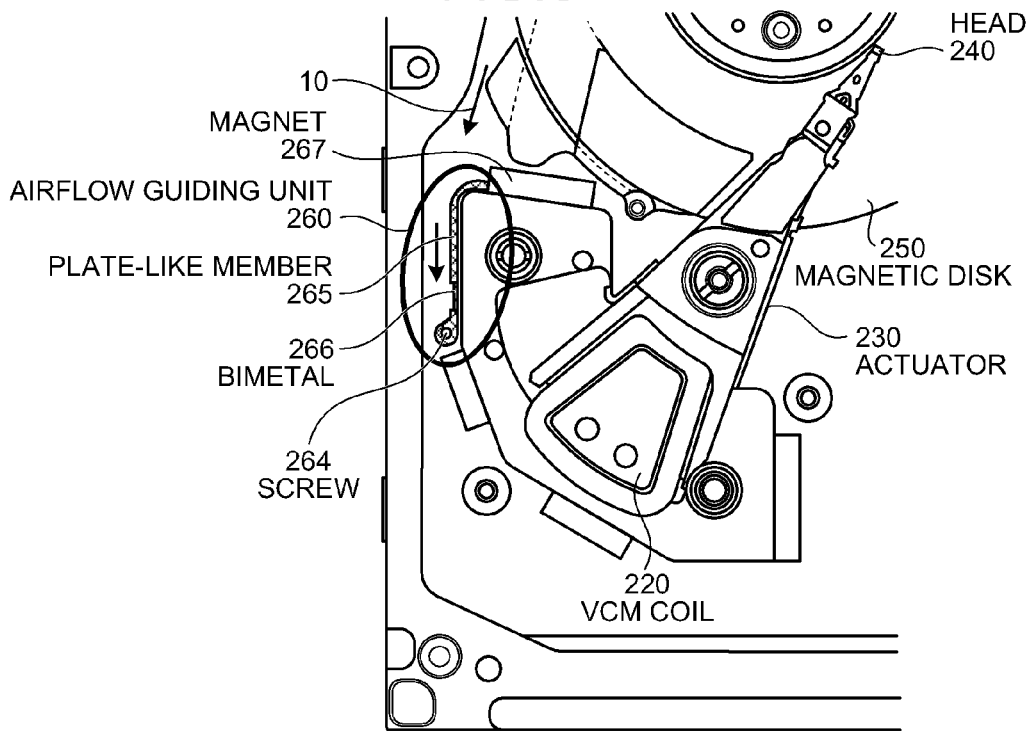
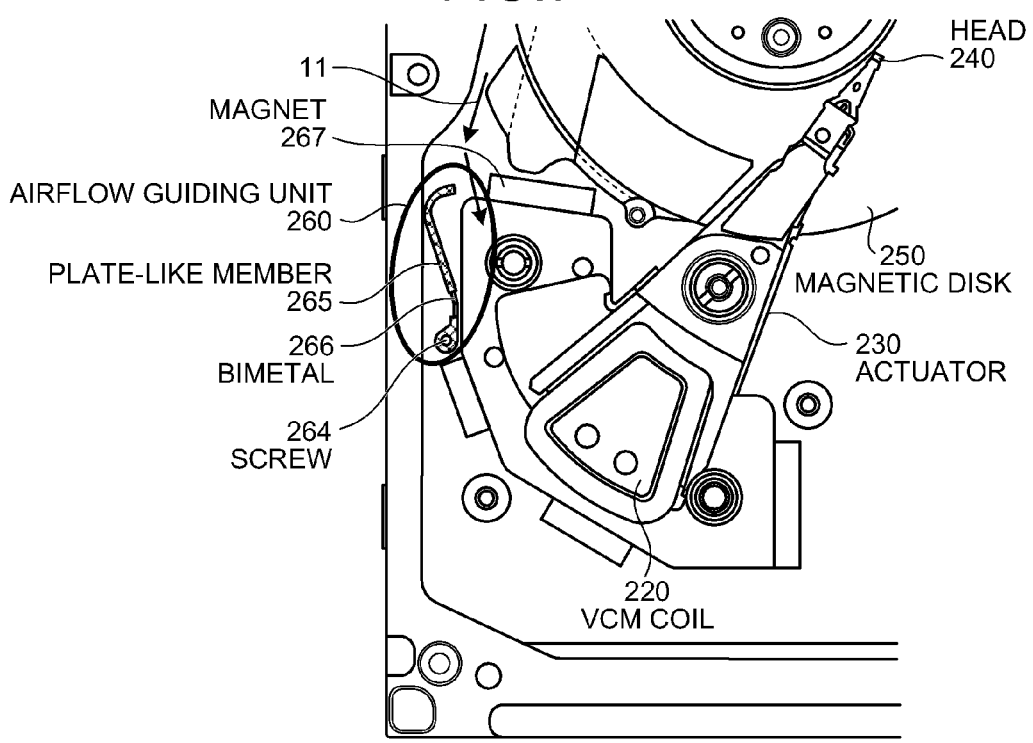

RECORDING MEDIUM DRIVING DEVICE

CROSS-REFERENCE TO RELATED APPLICATION(S)

This application is based upon and claims the benefit of priority of the prior Japanese Patent Application No. 2008-200069, filed on Aug. 1, 2008, the entire contents of which are incorporated herein by reference.

FIELD

The embodiments discussed herein are directed to a recording-medium driving device capable of suppressing an increase in temperature of an Voice-Coil-Motor (VCM) coil and a decrease in positioning accuracy of a magnetic head.

BACKGROUND

In recent years, with the expansion of the recording capacity of magnetic disk devices, the density of recording with a magnetic head onto a recording medium has been increased. For this reason, it is important to increase positioning accuracy of the magnetic head when data is written onto the recording medium.

For positioning of the magnetic head on a track of a magnetic disk, the VCM is generally used. The VCM includes an electromagnetic coil (hereinafter, referred to as "VCM coil"). By using the VCM coil, a revolving arm is controlled so that a magnetic head at the tip of the revolving arm is moved to a target position on a track.

When this movement of the magnetic head continues, it is known that the VCM coil is so heated by an electrical signal transferring through a wire material that the temperature of the VCM coil exceeds its heat-resistant temperature, becoming unable to keep its shape as a coil to possible malfunction.

To get around this problem, a technology is disclosed in which a component that lets an airflow pass toward the VCM coil is provided to supply an airflow occurring by the rotation of the magnetic disk to the VCM coil, thereby cooling the VCM coil.

Meanwhile, it is known that, when a VCM coil is used to move the magnetic head, blowing air on the VCM coil decreases accuracy of positioning the magnetic head at a target point on a track.

To get around this problem, in a disclosed example of configuration of the magnetic disk device, an airway is provided along the outer wall of a housing that covers the magnetic disk to let an airflow occurring over the disk surface by the rotation of the magnetic disk flow through the airway, thereby preventing air from blowing onto the VCM coil. Such conventional technologies are also exemplarily disclosed in Japanese Laid-open Patent Publication No. 2000-156068 and Japanese Laid-open Patent Publication No. 11-110960.

However, preventing air from blowing onto the VCM coil may disadvantageously cause a malfunction of the magnetic disk device due to an increase in temperature.

Thus, in a conventional technology of blowing air onto the VCM coil for cooling so as to prevent an increase in temperature of the VCM coil, an airflow occurring by the rotation of the magnetic disk is always supplied to the VCM coil. Therefore, even when it is not necessary to cool the VCM coil, the supplied airflow rocks the VCM coil, thereby possibly decreasing positioning accuracy of the magnetic head. In particular, when the rotation speed of the magnetic disk is set high, the airflow speed is also high, thereby causing the VCM coil to be rocked strongly and further decreasing positioning accuracy of the magnetic head. Moreover, when the magnetic disk device is downsized, the rocking of the VCM coil is relatively increased, thereby possibly causing a significant decrease in positioning accuracy of the magnetic head.

According to the configuration of the recording-medium driving device of the present invention, when the temperature of the control unit exceeds the limit value defined in advance, the temperature of the control unit can be decreased by using the guided airflow, thereby cooling the control unit as required. As a result, it is possible to prevent a malfunction of the recording-medium driving device due to an increase in temperature of the control unit. Also, in the recording-medium driving device according to the present invention, when the temperature of the control unit does not exceed the limit value defined in advance, the airflow toward the control unit is cut off, thereby preventing the rocking of the control unit and increasing overall accuracy of positioning the magnetic head.

SUMMARY

According to an aspect of the invention, a recording-medium driving device includes a control unit that controls movement of a head for recording or reproducing information onto and from a rotating recording medium; and an airflow guiding unit that guides an airflow occurring with rotation of the recording medium toward the control unit when a temperature of the control unit exceeds a limit value defined in advance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram of an airflow guiding unit according to the first embodiment (in a normal state);

FIG. 3 is a diagram of the airflow guiding unit according to the first embodiment (when the temperature of a VCM coil is high);

FIG. 6 is a diagram of an airflow guiding unit according to a second embodiment (in a normal state); and FIG. 7 is a diagram of the airflow guiding unit according to the second embodiment (when the temperature of the VCM coil is high).

DESCRIPTION OF EMBODIMENTS

Preferred embodiments of the present invention will be explained with reference to accompanying drawings. Note that the present invention is not limited to the embodiments.

[a] First Embodiment

Figure 1:
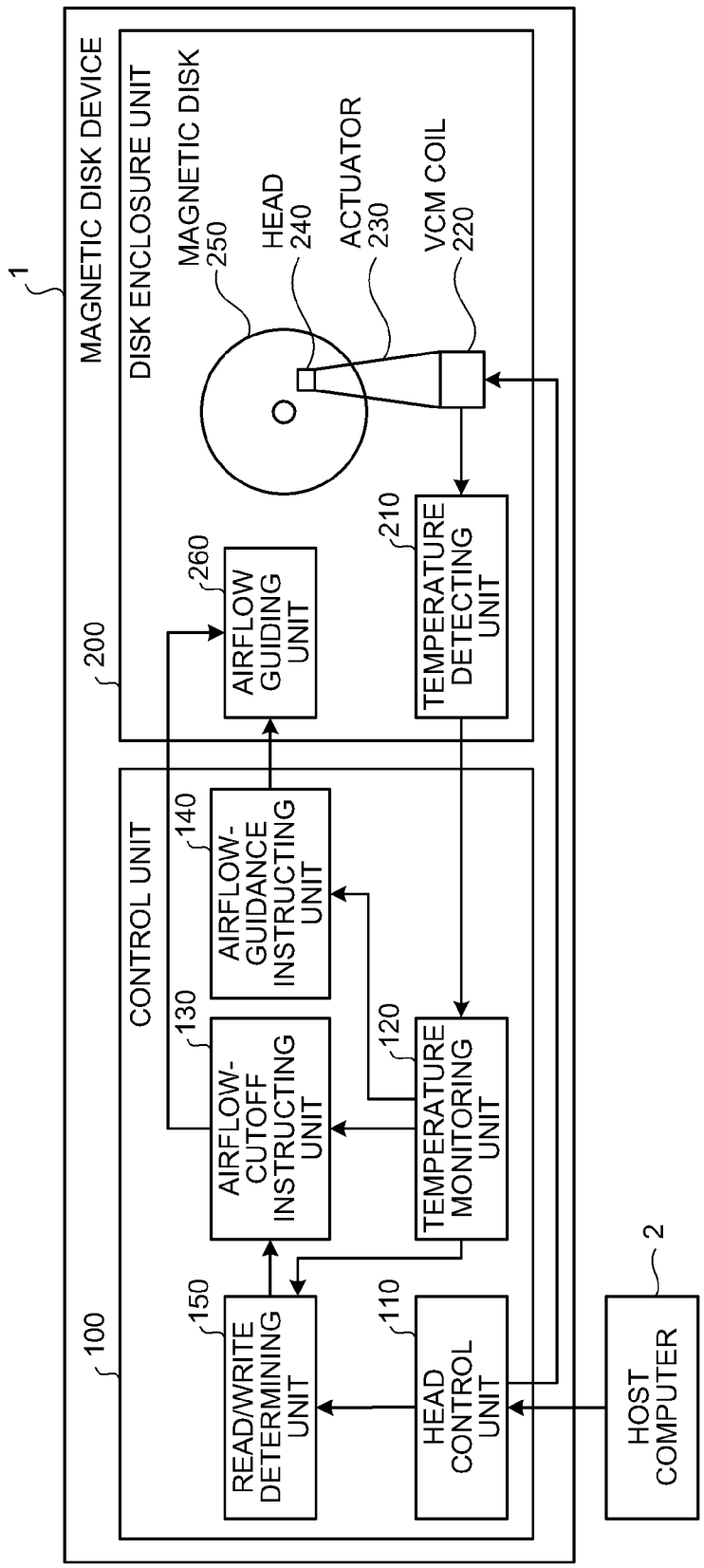
FIG. 1 is a functional block diagram of the entire configuration of a magnetic disk device according to a first embodiment.

FIG. 1 is a functional block diagram of the entire configuration of a magnetic disk device according to a first embodiment. As depicted in the drawing, a magnetic disk device 1 is connected to a host computer 2, and includes a control unit 100 and a disk enclosure unit 200.

The control unit 100 is a control device that controls an airflow guiding unit 260, which will be explained further below. The control unit 100 includes a head control unit 110, a temperature monitoring unit 120, an airflow-cutoff instructing unit 130, an airflow-guidance instructing unit 140, and a read/write determining unit 150.

The head control unit 110 controls positioning of a head 240 that reads and writes data from and to a magnetic disk 250 when a data write request or a data read request is received from the host computer 2. At this time, the head control unit 110 outputs to the read/write determining unit 150 a write signal indicative of an input of the write request or a read signal indicative of an input of the read request.

The temperature monitoring unit 120 monitors the temperature of a VCM coil 220 detected by a temperature detecting unit 210. When the temperature of the VCM coil 220 exceeds a limit temperature that guarantees the operation of the VCM coil 220, the temperature monitoring unit 120 outputs to the airflow-guidance instructing unit a signal informing that the temperature exceeds the limit temperature. On the other hand, when the temperature of the VCM coil 220 is below the limit temperature, the temperature monitoring unit 120 outputs to the airflow-cutoff instructing unit 130 a signal informing that the temperature is below the limit temperature.

Upon obtaining from the temperature monitoring unit a signal informing that the temperature of the VCM coil 220 is below the limit temperature, the airflow-cutoff instructing unit 130 stops application of current onto the airflow guiding unit 260 so as to instruct the airflow guiding unit 260 to cut off the airflow toward the VCM coil 220. Also, upon obtaining a write signal from the read/write determining unit 150, the airflow-cutoff instructing unit 130 stops application of current onto the airflow guiding unit 260 so as to instruct the airflow guiding unit 260 to cut off the airflow toward the VCM coil 220.

Upon obtaining from the temperature monitoring unit a signal informing that the temperature of the VCM coil 220 exceeds the limit temperature, the airflow-guidance instructing unit 140 applies current onto the airflow guiding unit 260 so as to instruct the airflow guiding unit 260 to guide the airflow toward the VCM coil 220.

Upon obtaining a write signal or a read signal from the head control unit 110, the read/write determining unit 150 determines whether the obtained signal is a write signal. When determining that the obtained signal is a write signal, the read/write determining unit 150 outputs the write signal to the airflow-cutoff instructing unit 130.

The disk enclosure unit 200 includes the temperature detecting unit 210, the VCM coil 220, an actuator 230, the head 240, the magnetic disk 250, and the airflow guiding unit 260.

The temperature detecting unit 210 detects the temperature of the VCM coil 220, and then outputs detected temperature information to the temperature monitoring unit 120. For example, the temperature detecting unit 210 detects the temperature of the VCM coil 220 by including a temperature measuring sensor and being placed near the VCM coil 220. Also, the temperature detecting unit 210 may estimate the temperature of the VCM coil 220 by, for example, using a resistance method to monitor a resistance value when current is applied to the VCM coil 220.

Upon obtaining a read signal or a write signal from the head control unit 110, the VCM coil 220 rocks the actuator 230 based on the obtained signal to position the head 240 for reading and writing data from and in the magnetic disk 250. Specifically, the VCM coil 220 is energized in a magnetic field generated by a magnet (not shown) facing across the VCM coil 220 to rock the actuator 230, thereby determining the position of the head 240 mounted at the tip of the actuator 230. In this manner, the VCM coil 220 positions the head 240 by being energized. Therefore, for example, when the VCM coil 220 is energized for a long time, the temperature may increase to exceed a limit temperature.

The actuator 230 rocks under the control of the VCM coil 220 to move the head 240.

The head 240 moves (seeks) to a read/write position on the magnetic disk 250 according to the rocking of the actuator 230 to read and write data at the reached position.

The magnetic disk 250 is a disk-like medium for magnetically recording data. The magnetic disk 250 rotates in a circumferential direction when data is read or written by the head 240. With this rotation of the magnetic disk 250, an airflow occurs. The airflow is used by the airflow guiding unit 260, which will be explained further below.

When the temperature of the VCM coil 220 exceeds the limit temperature, the airflow guiding unit 260 guides the airflow occurring by the rotation of the magnetic disk 250. When the temperature of the VCM coil 220 is below the limit temperature, the airflow guiding unit 260 cuts off the airflow occurring by the rotation of the magnetic disk 250 so that the airflow does not go toward the VCM coil 220. Specifically, when applied with current by the airflow-guidance instructing unit 140, the airflow guiding unit 260 guides the airflow occurring by the rotation of the magnetic disk 250 so that the airflow goes toward the VCM coil 220. Thus, by using the airflow occurring by the rotation of the magnetic disk 250, the airflow guiding unit 260 can cool the VCM coil 220 at its temperature exceeding the limit temperature. Also, when application of current is stopped by the airflow-cutoff instructing unit 130, the airflow guiding unit 260 cuts off the airflow occurring by the rotation of the magnetic disk 250 so that the airflow does not go toward the VCM coil 220. Thus, since the airflow guiding unit 260 does not cause the airflow occurring by the rotation of the magnetic disk 250 to blow directly onto the VCM coil 220, the VCM coil 220 does not rock and, as a result, the head 240 does not rock, thereby increasing accuracy of positioning the head 240 onto the magnetic disk 250. This state of cutting off the airflow toward the VCM coil 220 is taken as a normal state for the airflow guiding unit 260. A specific configuration of the airflow guiding unit 260 will be explained in detail below.

Next, the detailed configuration of the airflow guiding unit 260 according to the first embodiment is explained with reference to FIG. 2. In FIG. 2, components identical to those in FIG. 1 are provided with the same reference numerals, and are not explained in detail. Also, the airflow guiding unit 260 depicted in FIG. 2 is in a state of cutting off the airflow toward the VCM coil 220 (normal state).

As depicted in FIG. 2, the airflow guiding unit 260 is formed of an electromagnetic latch including a latch plate 261, a spring 262, a coil 263, and a screw 264. Also, the latch plate 261 includes a plate-like member 261a and a rotating member 261b.

The plate-like member 261a of the latch plate 261 guides an airflow 10 occurring by the rotation of the magnetic disk 250 toward the VCM coil 220 disposed on a downstream side of the magnetic disk 250, or cuts off the airflow 10 so that the airflow 10 does not directly go toward the VCM coil 220. For example, the plate-like member 261a has a tip bent so as to cut off the airflow 10 to a position where the VCM coil 220 is disposed. Also, the plate-like member 261a has the other end lead to the rotating member 261b. Furthermore, the plate-like member 261a is under tension by the spring 262 joined near the center so as to be pulled in a direction of the VCM coil 220.

The rotating member 261b of the latch plate 261 rotates the plate-like member 261a. The rotating member 261b is rotatably supported by the screw 264 to rotate the plate-like member 261a with the screw 264 as a pivot.

The spring 262 moves the plate-like member 261a in a direction of approaching the VCM coil 220. That is, the spring 262 moves the latch plate 261 to a position of cutting off the airflow 10 toward the VCM coil 220 and keeps the position of the plate-like member 261a in a natural state without elastic force.

The coil 263 is disposed on an opposite side of the spring 262 over the latch plate 261, moving the plate-like member 261a in a direction of going away from the VCM coil 220. That is, when current is applied to the coil 263, the magnetic field generated by the coil 263 attracts the plate-like member 261a. With the rotation of the rotating member 261b, the plate-like member 261a moves in a direction of going away from the VCM coil 220. At this time, the coil 263 attracts the plate-like member 261a with a force stronger than the elastic force of the spring 262. As a result, the plate-like member 261a guides the airflow 10 toward the VCM coil 220. Here, since the magnetic field disappears if no current is applied to the coil 263, the plate-like member 261a moves with the rotation of the rotating member 261b by the elastic force of the spring 262. As a result, the plate-like member 261a cuts off the airflow 10 toward the VCM coil 220.

Next, the operation of the airflow guiding unit 260 guiding the airflow toward the VCM coil 220 is explained with reference to FIG. 3. In FIG. 3, components identical to those in FIG. 2 are provided with the same reference numerals, and are not redundantly explained.

First, when the temperature of the VCM coil 220 is below the limit temperature, the latch plate 261 of the airflow guiding unit 260 is held at a position of cutting off the airflow toward the VCM coil 220. Then, when the temperature of the VCM coil 220 is increased to exceed the limit temperature, the temperature detecting unit 210 detects the temperature of the VCM coil 220, and outputs the detection result to the temperature monitoring unit 120. Furthermore, the temperature monitoring unit 120 obtaining the temperature of the VCM coil 220 detected by the temperature detecting unit 210 outputs to the airflow-guidance instructing unit 140 a signal informing that the temperature exceeds the limit temperature. The airflow-guidance instructing unit 140 obtaining the signal informing that the temperature exceeds the limit temperature applies current to the coil 263.

The coil 263 applied with current then generates a magnetic field to attract the plate-like member 261a. The plate-like member 261a then moves with the rotation of the rotating member 261b in a direction of going away from the VCM coil 220. With this, the plate-like member 261a is held at a position of guiding an airflow 11 toward the VCM coil 220, thereby guiding the airflow 11 toward the VCM coil 220. As a result, the guided airflow 11 cools the VCM coil 220.

In this manner, by using the airflow 11 occurring by the rotation of the magnetic disk 250, the airflow guiding unit 260 can cool the VCM coil 220 at its temperature exceeding the limit temperature.

Figure 4:
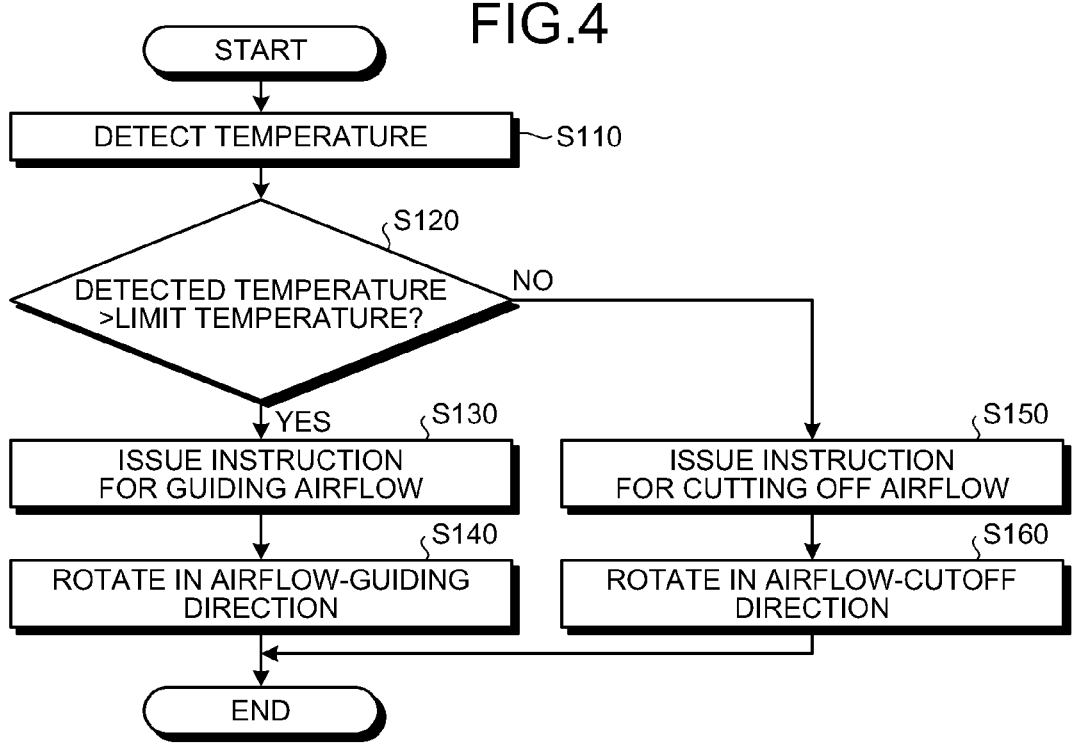
FIG. 4 is a flowchart of the process of the magnetic disk device according to the first embodiment.

Next, the process of the magnetic disk device according to the first embodiment is explained with reference to FIG. 4. FIG. 4 is a flowchart of the process of the magnetic disk device according to the first embodiment.

First, the temperature detecting unit 210 detects the temperature of the VCM coil 220 (Step S110). The temperature detecting unit 210 then outputs the detected temperature information of the VCM coil 220 to the temperature monitoring unit 120.

The temperature monitoring unit 120 then determines whether the temperature information output from the temperature detecting unit 210 exceeds the limit temperature that guarantees the operation of the VCM coil 220 (Step S120).

When the temperature information obtained by the temperature detecting unit 210 exceeds the limit temperature (Yes at Step S120), a signal informing that the temperature exceeds the limit temperature is output to the airflow-guidance instructing unit 140.

The airflow-guidance instructing unit 140 then applies current to the coil 263 to guide the airflow toward the VCM coil 220 (Step S130).

With this, the latch plate 261 is attracted to the current-applied coil 263, rotating in a direction of going away from the VCM coil 220 (Step S140). Thus, the latch plate 261 guides the airflow occurring by the rotation of the magnetic disk 250 to the VCM coil 220, thereby cooling the VCM coil 220.

On the other hand, when the temperature indicated by the temperature information output from the temperature detecting unit 210 is below the limit temperature (No at Step S120), a signal informing that the temperature is below the limit temperature is output to the airflow-cutoff instructing unit 130.

The airflow-cutoff instructing unit 130 then stops application of current to the coil 263 so as to cut off the airflow toward the VCM coil 220 (Step S150).

With this, the latch plate 261 moves by the elastic force of the spring 262 (Step S160). Thus, the latch plate 261 cuts off the airflow occurring by the rotation of the magnetic disk 250 so that the airflow does not go toward the VCM coil 220, thereby preventing rocking of the VCM coil 220 by the airflow and increasing accuracy of positioning the head 240 onto the magnetic disk 250.

Meanwhile, explanation has been made above to the case in which the airflow guiding unit 260 is in a state of guiding the airflow toward the VCM coil 220 when the temperature of the VCM coil 220 exceeds the limit temperature. However, the present invention is not meant to be restricted to this case. Alternatively, when data write is performed so as to increase data-write accuracy even if the temperature of the VCM coil 220 exceeds the limit temperature, the airflow guiding unit 260 may be in a state of cutting off the airflow toward the VCM coil 220 (normal state).

Figure 5:
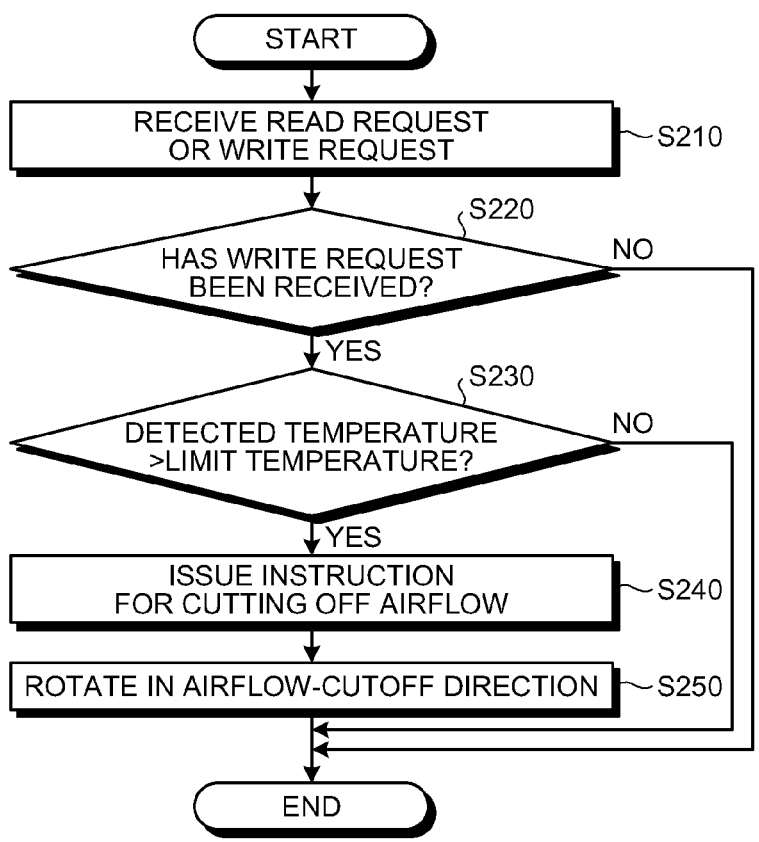
FIG. 5 is a flowchart of (a modified example of) a process of the magnetic disk device according to the first embodiment.

Thus, in FIG. 5, the process of the magnetic disk device is explained in which a state of cutting off the airflow toward the VCM coil 220 is caused when data write is performed even if the temperature of the VCM coil 220 exceeds the limit temperature.

First, upon obtaining a data read request or a data write request from the host computer 2, the head control unit 110 outputs the obtained data read request or data write request to the read/write determining unit 150 (Step S210).

Upon obtaining the data read request or the data write request from the head control unit 110, the read/write determining unit 150 determines whether the obtained request is a write request (Step S220).

When the request obtained by the read/write determining unit 150 is a write request (Yes at Step S220), the read/write determining unit 150 determines whether the temperature monitored by the temperature monitoring unit 120 exceeds the limit temperature (Step S230).

When the temperature monitored by the temperature monitoring unit 120 exceeds the limit temperature (Yes at Step S230), the write signal is output to the airflow-cutoff instructing unit 130.

The airflow-cutoff instructing unit 130 then instructs the airflow guiding unit 260 to stop application of current to the coil 263 so as to cut off the airflow toward the VCM coil 220 (Step S240).

The latch plate 261 then moves to a lock position of the spring 262 by the elastic force of the spring 262 (Step S250). With this, the latch plate 261 cuts off the airflow occurring by the rotation of the magnetic disk 250 so that the airflow does not go toward the VCM coil 220, thereby preventing rocking of the VCM coil 220 by the airflow and increasing accuracy of positioning the head 240 onto the magnetic disk 250.

On the other hand, when the request obtained by the read/write determining unit 150 is not a write request (No at Step S220) or when the temperature monitored by the temperature monitoring unit 120 does not exceed the limit temperature (No at Step S230), the process ends.

In this manner, the magnetic disk device 1 causes a state of cutting off the airflow toward the VCM coil 220 (normal state) when data write is performed even if the temperature of the VCM coil 220 exceeds the limit temperature, thereby increasing accuracy of positioning the head 240 onto the magnetic disk 250. Here, when the head 240 performs write, the head 240 stops its movement and the VCM coil 220 is not energized, and thus the temperature of the VCM coil 220 will gradually decrease. Therefore, there is no problem without cooling by the airflow guiding unit 260.

Here, the airflow guiding unit 260 is configured to rotate the latch plate 261 to guide the airflow toward the VCM coil 220. However, the present invention is not meant to be restricted to this. Alternatively, the airflow guiding unit 260 may be configured to open and close a shutter.

As explained above, according to the first embodiment, the magnetic disk device 1 includes the VCM coil 220 that controls the movement of the head 240 for recording or reproducing information onto and from the rotating magnetic disk 250, and the airflow guiding unit 260 that guides an airflow occurring by the rotation of the magnetic disk 250 toward the VCM coil 220 when the temperature of the VCM coil 220 exceeds a limit temperature defined in advance.

According to this configuration of the magnetic disk device 1, when the temperature of the VCM coil 220 exceeds the limit value defined in advance, the temperature of the VCM coil 220 can be decreased by using the guided airflow, thereby cooling the VCM coil 220 as required. As a result, it is possible to prevent a malfunction of the magnetic disk device 1 due to an increase in temperature of the VCM coil 220. Also, in the magnetic disk device 1, when the temperature of the VCM coil 220 does not exceed the limit value defined in advance, the airflow toward the VCM coil 220 is cut off, thereby preventing rocking of the VCM coil 220 and increasing overall accuracy of positioning the magnetic head 240.

[b] Second Embodiment

In the first embodiment, the case is explained in which the airflow guiding unit 260 is controlled by the control unit 100 so as to guide the airflow toward the VCM coil 220 when the temperature of the VCM coil 220 exceeds the limit temperature defined in advance. However, the present invention is not meant to be restricted to this. Alternatively, the airflow guiding unit 260 may not be controlled by the control unit 100 so as to guide the airflow toward the VCM coil 220 when temperature of the VCM coil 220 exceeds the limit temperature.

In a second embodiment, the case is explained in which the airflow guiding unit 260 is not controlled by the control unit 100 so as to guide the airflow toward the VCM coil 220 when the temperature of the VCM coil 220 exceeds the limit temperature defined in advance. First, the detailed configuration of the airflow guiding unit 260 according to the second embodiment is explained with reference to FIG. 6. In FIG. 6, components identical to those in FIG. 1 are provided with the same reference numerals, and are not explained in detail. Also, the airflow guiding unit 260 depicted in FIG. 6 is in a state of cutting off the airflow toward the VCM coil 220 (normal state).

As depicted in FIG. 6, the airflow guiding unit 260 includes the screw 264, a plate-like member 265, a bimetal 266, and a magnet 267.

The plate-like member 265 guides the airflow 10 occurring by the rotation of the magnetic disk 250 toward the VCM coil 220 disposed on a downstream side of the magnetic disk 250, or cuts off the airflow 10 so that the airflow 10 does not directly go toward the VCM coil 220. For example, the plate-like member 265 has a tip bent so as to cut off the airflow 10 to a position where the VCM coil 220 is disposed, and is attracted by the magnet 267. Also, the plate-like member 265 has the other end lead to the bimetal 266.

The bimetal 266 is fixed with the screw 264, and is a portion for rotating the plate-like member 265. The bimetal 266 includes two metal members with different coefficients of thermal expansion being laminated together. One of the metal members with a high coefficient of thermal expansion is laminated on the VCM coil 220 side so as to face the other of the metal members with a low coefficient of thermal expansion. Also, either one or both ends of these two metal members with different coefficients of thermal expansion are connected to an end of the plate-like member 265. Specifically, as the temperature of the VCM coil 220 increases, the bimetal 266 bends in a direction of the metal member with the low coefficient of thermal expansion. At this time, with the bending of the bimetal 266, the plate-like member 265 goes away from the magnet 267 to move in a direction of going away from the VCM coil 220. As a result, the plate-like member 265 guides the airflow 10 toward the VCM coil 220. Here, as the temperature of the VCM coil 220 decreases, the bimetal 266 returns to its original shape and stops as being attracted to the magnet 267. As a result, the plate-like member 265 cuts off the airflow 10 toward the VCM coil 220.

Next, the operation of the airflow guiding unit 260 guiding the airflow toward the VCM coil 220 is explained with reference to FIG. 7. In FIG. 7, components identical to those in FIG. 6 are provided with the same reference numerals, and are not redundantly explained.

First, when the temperature of the VCM coil 220 is below the limit temperature, the plate-like member 265 of the airflow guiding unit 260 is held at a position of cutting off the airflow toward the VCM coil 220. As the temperature of the VCM coil 220 is increased, the bimetal 266 bends in a direction toward the metal member with the low coefficient of thermal expansion, that is, in a direction of going away from the VCM coil 220. Then, when the temperature of the VCM coil 220 exceeds the limit temperature, the plate-like member 265 goes away from the magnet 267 to move in the direction of going away from the VCM coil 220 with the bending of the bimetal 266. With this, the plate-like member 265 is held at a position of guiding the airflow 11 toward the VCM coil 220, thereby guiding the airflow 11 toward the VCM coil 220. As a result, the guided airflow 11 blows onto the VCM coil 220.

In this manner, the airflow guiding unit 260 uses the airflow 11 occurring by the rotation of the magnetic disk 250 and guides the airflow 11 toward the VCM coil 220, thereby cooling the VCM coil 220 at its temperature exceeding the limit temperature. Also, the airflow guiding unit 260 can use the property of the bimetal 266 to guide the airflow 11 toward the VCM coil 220. Therefore, the airflow guiding unit 260 is not required to be controlled by any other control devices, thereby simplifying the device configuration.

As explained above, according to the second embodiment, the magnetic disk device 1 includes the magnetic disk 250 that causes the airflow 11 by rotation, the VCM coil 220 that gives a driving force to the head 240 for recording or reproducing information onto and from the magnetic disk 250, the plate-like member 265 that cuts off the airflow toward the VCM coil 220, and the bimetal 266 with a metal member with a high coefficient of thermal expansion being laminated on the VCM coil 220 side so as to face a metal member with a low coefficient of thermal expansion. The plate-like member 265 has one end coupled to an end of the metal member with the high coefficient of thermal expansion or the metal member with the low coefficient of thermal expansion.

According to this configuration of the magnetic disk device 1, when the temperature of the VCM coil 220 increases, the plate-like member 265 can be moved in a direction of going away from the VCM coil 220 with a low coefficient of thermal expansion by using the property of the bimetal 266, thereby guiding the airflow 11 toward the VCM coil 220. Therefore, it is not required to place any other control devices, thereby simplifying the device configuration.

Here, all or arbitrary part of the process functions performed in the control unit 100 of the magnetic disk device 1 may be achieved by a Central Processing Unit (CPU) (or a microcomputer, such as Micro Processing Unit (MPU) or Micro Controller Unit (MCU)) and a program analyzed and executed on that CPU (or microcomputer, such as MPU or MCU) or may be achieved as hardware with a wired logic. Furthermore, the magnetic disk device 1 can be applied not only to a magnetic disk device but also to a recoding-medium driving device with a similar structure, such as a disk device using other media, such as an optical disk and a magneto-optical disk.

According to an embodiment of the recording medium driving device, an effect can be achieved such that an increase in temperature of the VCM coil and a decrease in positioning accuracy of the magnetic head can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A recording-medium driving device comprising:
    a control unit that controls movement of a head for recording or reproducing information onto and from a rotating recording medium; and
    an airflow guiding unit that guides an airflow occurring with rotation of the recording medium toward the control unit when a temperature of the control unit exceeds a limit value defined in advance.

2. A recording-medium driving device comprising:
    a driving coil disposed on a downstream side of an airflow occurring from a rotating recoding medium for recording information, the driving coil giving a driving force to a head for recording or reproducing information onto and from the recording medium;
    a plate-like member that cuts off the airflow toward the driving coil; and
    a leading unit that leads the plate-like member to a position of not cutting off the airflow toward the driving coil when a temperature of the driving coil exceeds a limit value defined in advance.

3. The recording-medium driving device according to claim 2, wherein
    the leading unit includes
    a temperature monitoring unit that monitors the temperature of the driving coil;
    a coil disposed on an opposite side of the driving coil over the plate-like member;
    a current applying unit that applies current to the coil when the temperature monitored by the temperature monitoring unit exceeds the limit value defined in advance; and
    a rotating member that rotates the plate-like member in a direction of the coil when current is applied by the current applying unit to the coil.

4. The recording-medium driving device according to claim 2, wherein
    the leading unit leads the plate-like member to the position of not cutting off the airflow toward the driving coil when the temperature of the driving coil exceeds the limit value defined in advance and when the head is not recording information onto the recording medium.

5. The recording-medium driving device according to claim 2, wherein
    the leading unit includes
    a first metal plate; and
    a second metal plate that has a coefficient of thermal expansion higher than a coefficient of thermal expansion of the first metal plate, the second metal plate being laminated on a side of the driving coil from the metal plate so as to face the first metal plate, and
    the plate-like member has one end coupled to an end of the first metal plate or the second metal plate.

* * * * *